Patented Feb. 23, 1932

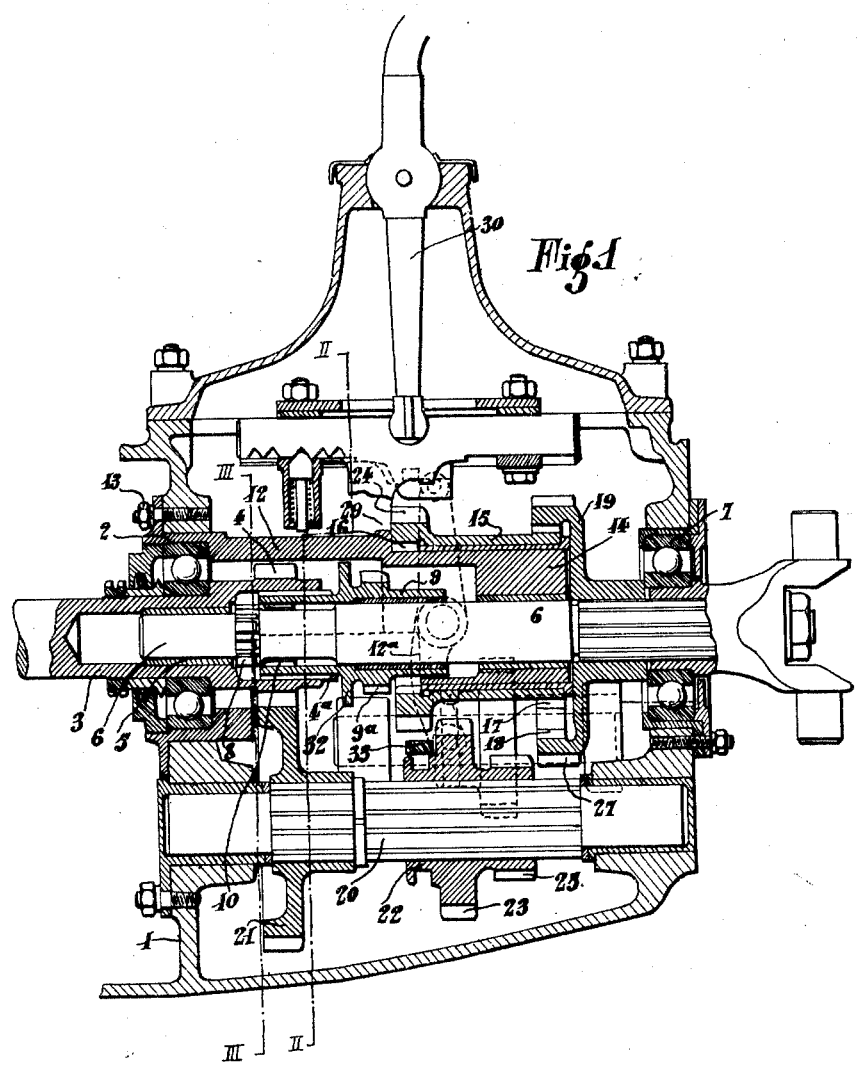

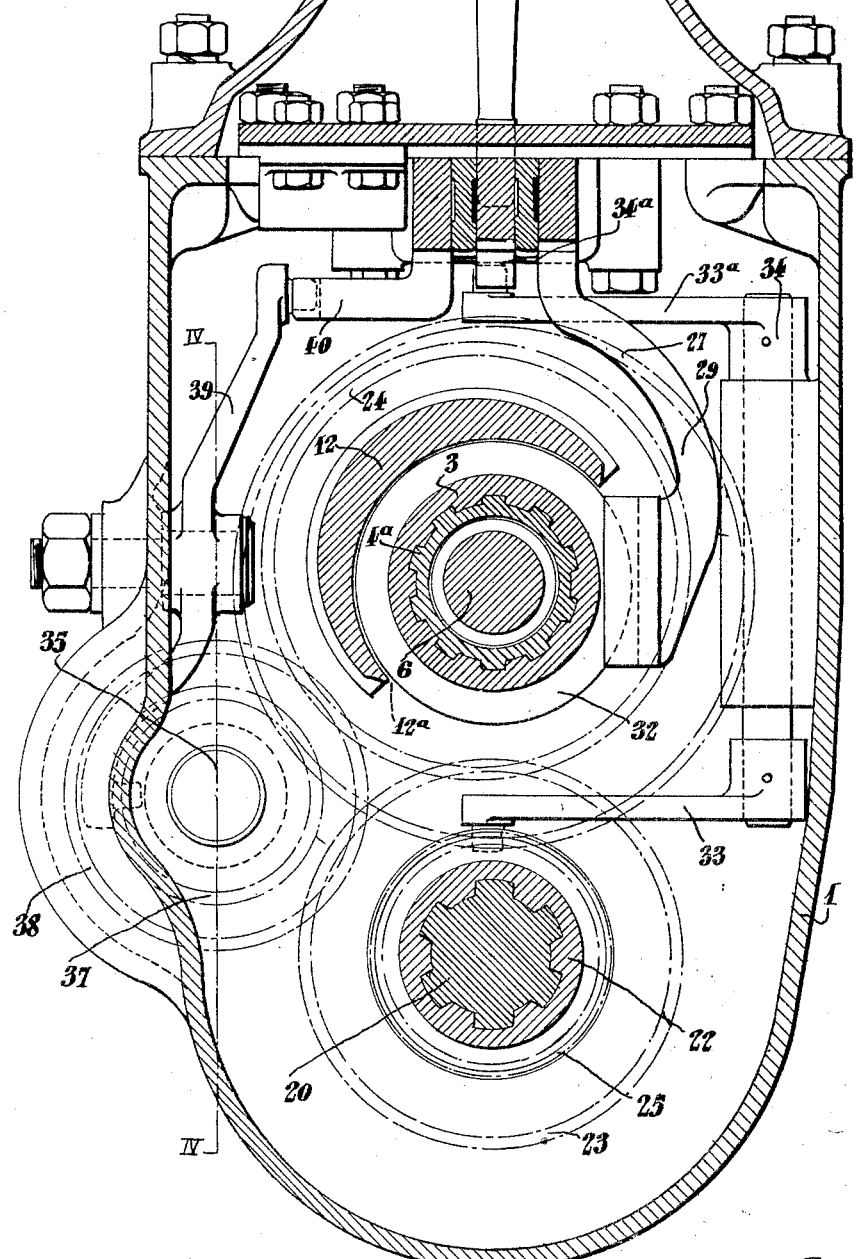

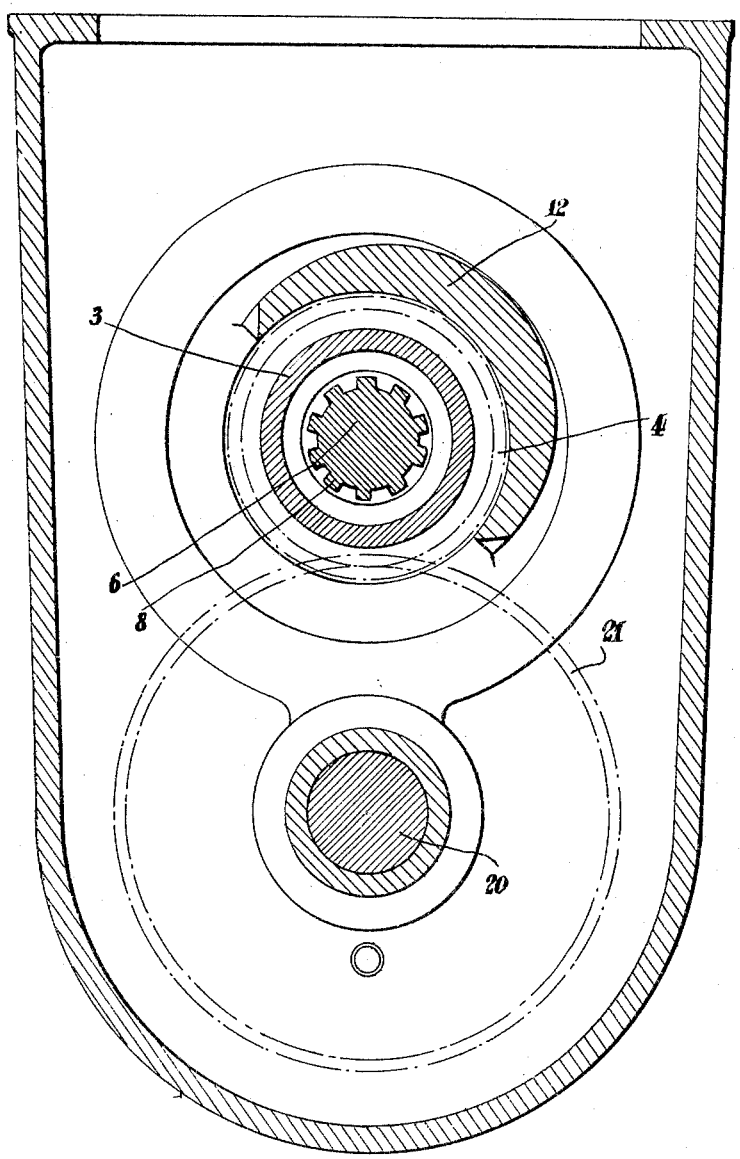

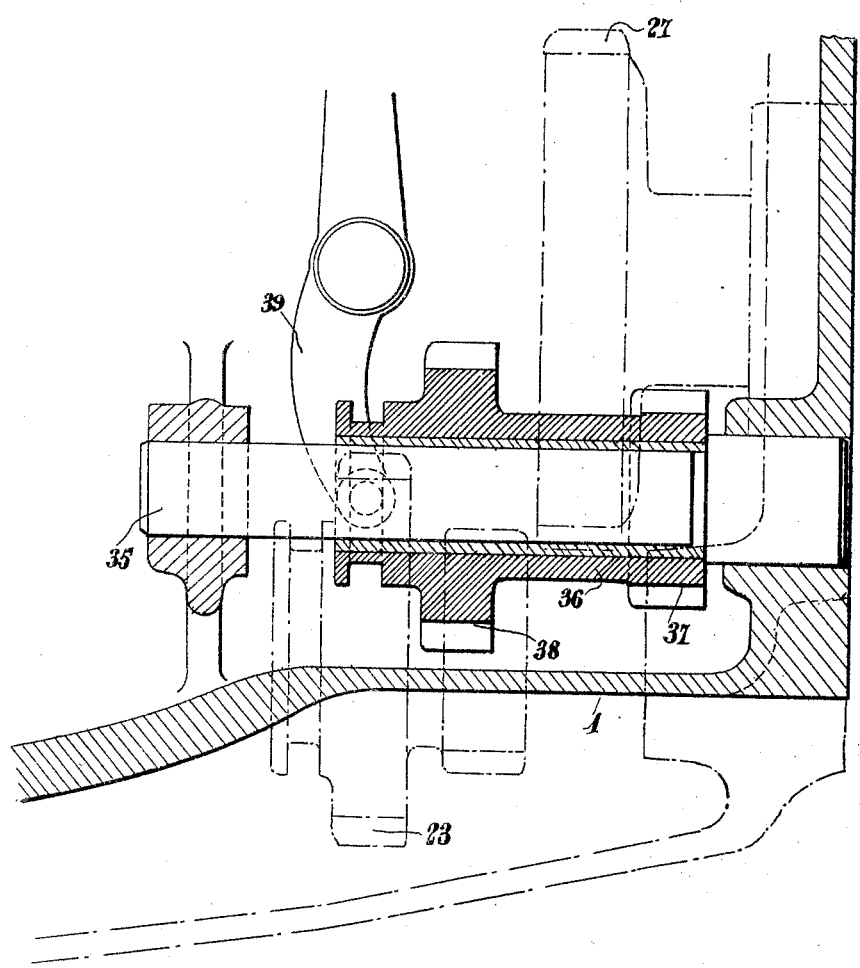

1,846,250

UNITED STATES PATENT OFFICE

ROBERT EMILE CHARLES DELEVOYE, OF PARIS, FRANCE, ASSIGNOR TO SOCIETE ANONYME DES ANCIENS ETABLISSEMENTS HOTCHKISS & CIE., OF SAINT-DENIS, SEINE, FRANCE, A JOINT-STOCK COMPANY OF FRANCE

GEAR BOX

Application filed May 21, 1930, Serial No. 454,412, and in France April 18, 1930.

The present invention relates to certain improvements in the gear box described in U. S. Patent No. 1,765,133. Said improvements relate more particularly to the arrangement of the driving shafts, sliding gears and pinions and their object is to enable a reduction of the total length of the unit to be obtained, as also a reduction in the amplitude of the longitudinal movements to be imparted to the several moving members for the various gear changes; the design is moreover more rigid.

According to the invention, the gear box for obtaining four speeds, one of which is a direct drive, comprises a driving shaft secured to a driving pinion, a driven shaft in alignment with the driving shaft and secured to an internally toothed plate, an eccentric fixed drum on which is mounted an intermediate gear train having an external toothing constantly meshing with the internal toothing of the plate of the driven shaft, and an internal toothing with which a pinion driven by the driving shaft can engage, a sleeve for obtaining direct drive which is adapted to slide on the driven shaft, constantly driven by the driving shaft and which connects said shaft to the driven shaft by coupling it with corresponding means provided at the end of the driven shaft, said sleeve having moreover a pinion adapted to mesh with the internal toothing of the intermediate gear train carried by the eccentric drum, a counter shaft parallel to the driving and driven shafts, and on which is mounted a pinion constantly meshing with the driving pinion, and a sliding gear on said shaft having two external toothings adapted to engage, the one with a second external toothing carried by the intermediate gear train, and the other with an external toothing carried by the plate of the driven shaft, said sliding gear moreover constantly rotating solid with the said counter shaft, means being provided to control and hold the aforementioned sliding gear and the sleeve securing direct drive in the several positions into which they may be brought.

Said gear box may be completed by a reverse speed device comprising a second counter-shaft on which is mounted a gear train of two pinions adapted to be brought simultaneously into engagement, the first with one of the two external toothings of the sliding gear carried by the countershaft, the second with the external toothing of the plate of the driven shaft.

Other characteristics and peculiarities of the invention will become apparent from the subsequent description with reference to the accompanying drawings in which:

Fig. 1 is a longitudinal sectional elevation (on the axis of the driving and driven shafts) of a gear box in accordance with the invention.

Fig. 2 is a corresponding cross section on the line II—II of Fig. 1.

Fig. 3 is another cross section on the line III—III of Fig. 1.

Fig. 4 is a longitudinal section on the line IV—IV of Fig. 2, that is to say, on the axis of the reverse speed countershaft.

The gear box illustrated in the drawings essentially comprises a casing 1 which may be of any suitable form and assembled in any suitable manner on the chassis of the motor vehicle to which the gear box illustrated is supposed to be adapted.

The driving shaft 3 connected to the engine is supported in one of the lateral cheeks of the casing 1, for example, in ball bearings 2. Said shaft 3, which carries a driving pinion 4, has formed in its end the cylindrical bore 5 in which is engaged the corresponding end of the driven shaft 6 (or its extension) co-axial with the driving shaft 3. The driven shaft 6 is likewise supported by means of ball bearings 7 in the other side cheek of the casing 1. A sleeve 9 for obtaining direct drive is adapted to slide over the driving shaft 3, and is rotated at the speed of the shaft 3 by means of the grooves 4a. Said sleeve has an inner fluted portion 10 which may engage with the outer grooves 8 on the driven shaft 6 and an outer toothing 9a which may engage with the inner toothing 16 of the intermediate gear train 15.

The gear box includes a drum 12 rigidly fixed, as by screws 13, to one of the cheeks of the casing 1, and eccentric relative to the shafts 3 and 6, this eccentricity being moreover equal to half the difference between the diameters of the pitch circles of the toothings 16 and 9a or 18 and 17. The drum 12 is hollow and the driven shaft 6 and the driving pinion 4 revolve in the bore thereof. Moreover, the end of said drum is formed as a bearing 14 resting directly on the driven shaft 6, so that said drum is rigidly supported at both ends. The drum 12 supports an intermediate gear train 15 loosely mounted thereon. Said intermediate gear train 15 has an internal toothing 16 with which may engage an outer toothing 9a of the sleeve 9. This engagement will be obtained provided that the eccentricity of the drum 12 is equal to that of the two internal and external toothings 16 and 9a which should mesh; furthermore, the drum 12 must be cut away at 12a. Moreover, at the other end of the intermediate gear train 15 is formed an external toothing 17 adapted to engage with the internal toothing 18 formed in a plate 19 keyed to the driven shaft 6.

The gear box likewise includes a countershaft 20 located parallel to the shafts 3 and 6 and supported at both ends by the side cheeks of the casing 1. Said shaft 20 is driven by a pinion 21 constantly engaging with the driving pinion 4, owing to the provision of the cut away portion 12a. On the counter shaft 20 a sliding gear 22 is adapted to slide while being constantly rotated therewith by means of suitable grooves, said sliding gear having an external toothed pinion 23 adapted to engage with an external toothing 24 on the intermediate gear train 15, and a second external pinion 25 adapted to engage with an external toothing 27 formed on the plate 19 which is secured to the driven shaft 6.

A system of levers of a conventional type has been illustrated in the accompanying drawings for controlling the longitudinal displacement of the sleeve 9 and the sliding gear 22. In the case in point the displacement of the sleeve 9 may be controlled by a fork 29 actuated by the usual gear lever 30 and which operates the circular cheek 32 secured to the sleeve 9. As for the displacement of the sliding gear 22, it is controlled by a lever 33 secured to a vertical shaft 34 which is controlled by an identical lever 33a actuated by a slide block 34a operated by the lever 30.

The above described gear box operates in the following manner:

To obtain direct drive, it is only necessary to displace the sleeve 9 by moving the lever 30 so as to bring said sleeve into its left end position. The toothing 10 of the sleeve 9 thus engages in the toothing 8 of the driven shaft 6. The sleeve 9 on the other hand constantly rotating with the driving shaft 3 through the medium of the grooves 4a, the driving shaft 3, and the driven shaft 6 are thus made to rotate solid; the intermediate gear train 15 and pinions 21, 23 and 25 rotate idly.

For the third speed, the sleeve 9 is displaced towards the right so as to bring the external toothing 9a of said sleeve into engagement with the internal toothing 16 of the intermediate gear train 15. The drive then takes place through the medium of the grooves 4a of the driving shaft 3, the external toothing 9a, the internal toothing 16, the external toothing 17 and the internal toothing 18 of the plate 19. The pinions 21, 23 and 25 are rotated idly.

For the second speed, the sleeve 9 is left in the neutral position (position shown in Fig. 1), and the sliding gear 22 is shifted to the left so as to cause its toothing 23 to engage with the external toothing 24 of the intermediate gear train 15. The drive is then transmitted by the pinion 4, the pinion 21, the toothing 23 of the sliding gear 22, the toothing 24 of the intermediate gear train 15, the external toothing 17 of the intermediate gear train 15 and the internal toothing 18 of the plate 19 secured to the driven shaft 6.

For the first speed, the sleeve 9 is again left in neutral position and the sliding gear 22 is shifted to the right so as to cause the toothing 25 of said sliding gear to engage with the external toothing 27 of the plate 19 secured to the driven shaft 6. The drive is then transmitted by the driving pinion 4, the pinion 21, the sliding gear 22, the toothing 25, the external toothing 27 and the plate 19. The intermediate gear train 15 rotates idly.

Thus the gear box according to the invention allows direct drive and three other speeds to be obtained, one of these speeds, the third in the case described, is obtained solely by means of internally toothed gears. The gear box is of very sturdy and compact design owing to the provision of the eccentric drum 12 supporting the intermediate gear train 15, and the particular arrangement of the pinions, sliding gears and intermediate gears.

Naturally, said gearbox can include a device enabling reverse speed to be obtained. For this purpose, it is only necessary to provide, as illustrated in Figs. 2 and 4, a second counter shaft 35 parallel to the aforementioned shafts, and on which a sliding gear 36 including pinions 37 and 38 rotates loosely. When the sliding gear 36 is shifted to the left (for example, by the lever 39 controlled by the slide-block 40 and the lever 30) the pinion 38 is brought into gear with the pinion 23 of the sliding gear 22, held in the neutral position, and the pinion 37 with the external toothing 27 of the plate 19 secured to the driven shaft 6. The direction of rotation of the driven shaft 6 is then reversed relative to that of the driving shaft 3. In this instance, the intermediate gear train 15 rotates idly.

It is moreover self-evident that the invention has only been described and illustrated here in a purely explanatory but in no way limitative manner, and that it could be subjected to modifications of detail without departing from the spirit thereof.

I claim:

1. In a change-speed gear, the combination of a driving shaft; a driven shaft, a fixed hollow drum disposed eccentrically about said driving and driven shafts, an intermediate longitudinally fixed gear train surrounding and carried by said fixed drum, means for continuously coupling said intermediate gear train to one of said shafts, and means mounted inside said hollow drum on one of said shafts and driven continuously by the shaft to which said intermediate gear is not continuously coupled, said second means being adapted to be selectively engaged with said intermediate gear train to transmit drive to said driven shaft.

2. In a change-speed gear, the combination of a driving shaft, a driven shaft, a fixed hollow drum disposed eccentrically about said driving and driven shafts, a sleeve slidably and loosely mounted on said driven shaft, a pinion secured to said sleeve, an intermediate non-slidable gear train mounted on said fixed drum and including internally toothed portions, said fixed drum having a cut-away portion whereby said internally toothed portion of said intermediate gear train can engage with said pinion, and means for continuously coupling said intermediate gear train to said driven shaft.

3. In a change-speed gear, the combination of a driving shaft, a driven shaft having a fluted portion, an internally toothed driving pinion fast on said driving shaft, a sleeve slidably and loosely mounted on said driven shaft and including an external toothing adapted to engage constantly with the internal toothing of said driving pinion and an internal toothing engageable with the fluted portion of said driven shaft upon displacement of said sleeve, whereby said driving and driven shafts are directly connected together.

4. In a change-speed gear box, the combination of a driving shaft, a driven shaft in alignment with said driving shaft and journalled in a bore thereof and having a fluted portion, an internally and externally toothed driving pinion fast on said driving shaft, a fixed hollow drum disposed eccentrically about said driving and driven shafts, an intermediate gear train mounted on said fixed drum and including two externally and one internally toothed portions, a plate fast on said driven shaft and including an external toothing and an internally toothed portion constantly gearing with one of said two external toothings of said intermediate gear train, a sleeve slidably and loosely mounted on said driven shaft and including an external toothing adapted to engage constantly with the internal toothing of said driving pinion, and an internal toothing engageable with the fluted portion of said driven shaft in order to couple together said driving and driven shafts, a pinion secured to said sleeve and capable of engaging said internally toothed portion of said intermediate gear train, a countershaft running parallel to said driving and driven shafts, a pinion mounted on said countershaft and constantly gearing with said external toothing of said driving pinion, a sliding gear mounted on said countershaft and including two pinions and adapted to gear respectively with said external toothing of said plate and the other of said two external toothings of said intermediate gear train, and selector means for shifting said sleeve and said sliding gear.

5. In a change-speed gear, the combination of a driving shaft, a driven shaft having a fluted portion, an internally toothed driving pinion fast on said driving shaft, a sleeve slidably and loosely mounted on said driven shaft and including an extended toothing adapted to engage constantly with the internal toothing of said driving pinion and an internal toothing engageable with the fluted portion of said driven shaft upon displacement of said sleeve, a fixed hollow drum disposed eccentrically about said driving and driven shafts, an intermediate non-slidable gear train mounted on said hollow drum and including an internally toothed portion with which a pinion mounted on said sleeve may be slid into engagement, said drum having to this end a cut-away portion, and means for continuously coupling said intermediate gear train to said driven shaft.

ROBERT EMILE CHARLES DELEVOYE.